(12) United States Patent
Riise et al.

(10) Patent No.: US 8,423,479 B2
(45) Date of Patent: Apr. 16, 2013

(54) TRUSTED THIRD PARTY CLEARING HOUSE FOR LEAD TRACKING

(75) Inventors: Soren Riise, Santa Clara, CA (US);
Devesh Patel, Cupertino, CA (US);
David Anthony Burgess, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 937 days.

(21) Appl. No.: 11/745,263

(22) Filed: May 7, 2007

(65) Prior Publication Data

US 2008/0281756 A1 Nov. 13, 2008

(51) Int. Cl.
*G06Q 99/00* (2006.01)

(52) U.S. Cl.
USPC ............... 705/317; 705/78; 705/500; 705/64

(58) Field of Classification Search ............... 705/1–79
See application file for complete search history.

(56) References Cited

U.S. PATENT DOCUMENTS

| | | | |
|---|---|---|---|
| 5,987,440 A * | 11/1999 | O'Neil et al. ............... 705/44 |
| 5,991,740 A * | 11/1999 | Messer ............... 705/14.29 |
| 6,317,745 B1 | 11/2001 | Thomas et al. |
| 6,751,652 B1 | 6/2004 | Thomas |
| 7,017,050 B2 | 3/2006 | Dalton, Jr. et al. |
| 7,133,846 B1 | 11/2006 | Ginter et al. |
| 7,181,017 B1 | 2/2007 | Nagel et al. |
| 7,340,411 B2 * | 3/2008 | Cook ............... 705/7.13 |
| 7,596,501 B2 | 9/2009 | Tivey et al. |
| 2001/0047289 A1 | 11/2001 | Mckee et al. |
| 2002/0049654 A1 | 4/2002 | Thomas et al. |
| 2002/0141584 A1 | 10/2002 | Razdan et al. |
| 2003/0050976 A1 | 3/2003 | Block et al. |
| 2003/0078788 A1 * | 4/2003 | Sussman et al. ............... 705/1 |
| 2003/0233422 A1 | 12/2003 | Csaszar et al. |
| 2004/0143482 A1 * | 7/2004 | Tivey et al. ............... 705/10 |
| 2004/0143483 A1 * | 7/2004 | Tivey et al. ............... 705/10 |
| 2004/0143484 A1 * | 7/2004 | Kapadia et al. ............... 705/10 |

(Continued)

FOREIGN PATENT DOCUMENTS

| | | |
|---|---|---|
| KR | 2000-0058867 A | 10/2000 |
| KR | 10-2003-0015519 A | 2/2003 |
| WO | WO 02/059724 A2 | 8/2002 |
| WO | WO 2005/001635 A2 | 1/2005 |

OTHER PUBLICATIONS

"Distributed Checksum Clearinghouse," http://www.rhyolite.com/anti-spam/dcc/, 6 pages (Mar. 21, 2007).

(Continued)

*Primary Examiner* — Alexander Kalinowski
*Assistant Examiner* — Murali Dega
(74) *Attorney, Agent, or Firm* — Nathan O. Greene; Brinks Hofer Gilson & Lione

(57) ABSTRACT

A method for tracking sales leads, including a lead clearing house logging receipt in a log of one or more encrypted leads received from a participant of the lead clearing house, the one or more leads including personal lead information having been encrypted with a one-way hash algorithm; comparing the received one or more encrypted leads with stored encrypted leads to find any matches; updating the log related to the one or more encrypted leads with unencrypted log information associated with the matching one or more encrypted leads; and communicating a status to the participant based on the log relating to the one or more leads.

16 Claims, 6 Drawing Sheets

U.S. PATENT DOCUMENTS

| | | | |
|---|---|---|---|
| 2005/0055317 A1* | 3/2005 | Carrott et al. | 705/67 |
| 2005/0119912 A1 | 6/2005 | Griswold | |
| 2005/0283621 A1* | 12/2005 | Sato et al. | 713/189 |
| 2006/0041500 A1* | 2/2006 | Diana et al. | 705/37 |
| 2006/0064340 A1* | 3/2006 | Cook | 705/10 |
| 2006/0195385 A1 | 8/2006 | Khetrapal et al. | |
| 2006/0200360 A1* | 9/2006 | Razletovskiy | 705/1 |
| 2006/0248016 A1 | 11/2006 | Ginter et al. | |
| 2006/0277115 A1* | 12/2006 | McKee et al. | 705/26 |
| 2007/0027746 A1 | 2/2007 | Grabowich | |
| 2007/0067354 A1 | 3/2007 | Mullender et al. | |
| 2007/0073607 A1 | 3/2007 | Eydelman | |
| 2007/0112582 A1* | 5/2007 | Fenlon | 705/1 |
| 2007/0130101 A1 | 6/2007 | Anderson et al. | |
| 2007/0143825 A1 | 6/2007 | Goffin | |
| 2007/0156446 A1 | 7/2007 | Jolly et al. | |
| 2007/0203906 A1 | 8/2007 | Cone et al. | |
| 2007/0239721 A1* | 10/2007 | Ullman et al. | 707/9 |
| 2007/0244740 A1 | 10/2007 | Desenberg | |
| 2007/0271110 A1 | 11/2007 | Van Der Linden et al. | |
| 2007/0271138 A1 | 11/2007 | Van Der Linden et al. | |
| 2007/0274472 A1 | 11/2007 | Gould | |
| 2007/0297610 A1* | 12/2007 | Chen et al. | 380/270 |
| 2008/0133273 A1 | 6/2008 | Marshall | |

OTHER PUBLICATIONS

"Steve Friedl's Unixwiz.net Tech Tips: An Illustrated Guide to Cryptographic Hashes," http://www.unixwiz.net/techtips/iguide-crypto-hashes.html, 13 pages (Mar. 26, 2007).

Written Opinion and International Search Report for corresponding International Application No. PCT/US2008/060625, mailed Sep. 29, 2008 (10 pages).

International Preliminary Report on Patentability for International Application No. PCT/US2008/060625, dated Nov. 10, 2009 (5 pages).

Office Action for related U.S. Appl. No. 11/756,947, dated Jan. 22, 2010 (26 pages).

* cited by examiner

TRUSTED THIRD PARTY CLEARING HOUSE FOR LEAD TRACKING

BACKGROUND OF THE INVENTION

1. Technical Field

The disclosed embodiments relate to a system and its methods for a trusted third party clearing house to track statuses of leads generated and sold to commercial lead consumers.

2. Related Art

Before the Internet, advertisers sought to generate leads through the use of junk mail, or the collection of contact information from those who enter to win something free, like a car or a vacation. Additionally, there was the use of referral-based lead calling.

Since the establishment of the Internet, advertising models have consisted primarily of tracking impressions and clicks, which has been the predominate method for obtaining Internet traffic, e.g. with use of banner or search advertising. For instance, in traditional advertising business, advertisers have been using models such as Cost Per Impression (CPM) or Cost Per Click (CPC) as a means to generate traffic and encourage Internet (or web) users to connect to websites of a vendor. Spam e-mail and other forms of advertising have also been developed to entice consumers with free or reduced cost goods or services as a way to get more consumers to reach a vendor's website.

Once at a vendor website, the Internet user performs a transaction that is deemed the main purpose for the business of the website, such as supplying the details of a credit card application, signing up for a free newsletter, or some other similar activity. Private information of the Internet user may be gathered by the vendor or advertiser (which can be the same entity) and sold to a commercial consumer of leads, usually a consumer in the business related to the purpose of the consumer's visit to the vendor's website.

SUMMARY

By way of introduction, the embodiments described below include a system and methods for augmenting sponsored search results in a search engine with natural search click events. The embodiments relate to a system and methods for tracking sales leads.

In a first aspect, a method is disclosed for tracking sales leads within a lead sales system, including pre-processing lead information for a lead obtained by a participant of the system. The method further includes encrypting personal information of the pre-processed lead with a one-way hash algorithm as a transmittable message, sending the message containing the encrypted lead and associated unencrypted log information to a lead clearing house, and selling the lead to a lead consumer.

In a second aspect, a method for tracking sales leads within a lead sales system, includes a lead clearing house logging receipt in a log of one or more encrypted leads received from a participant of the lead clearing house, the one or more leads including personal lead information having been encrypted with a one-way hash algorithm. The method further includes comparing the received one or more encrypted leads with stored encrypted leads to find any matches, updating the log related to the one or more encrypted leads with unencrypted log information associated with the matching one or more encrypted leads, and communicating a status to the participant based on the log relating to the one or more leads.

In a third aspect, a lead clearing house server for tracking sales leads includes a network interface, to receive over a network, messages comprising personal lead information encrypted with a one-way hash algorithm, each message comprising at least one encrypted lead and unencrypted log information. A memory is provided to store received encrypted leads together with a log in relation to each encrypted lead. A processor is in communication with the memory and the network interface, and includes a comparison module to compare received encrypted leads with stored encrypted leads and a logging module to log receipt of the encrypted leads along with the associated log information. If a received encrypted lead has a stored match, the logging module updates the log that is in relation to the matching stored encrypted lead. A communication module is in communication with the processor and the network interface to send to a participant of the lead clearing house that sent the at least one encrypted lead a status based on the log in memory related to the at least one encrypted lead.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
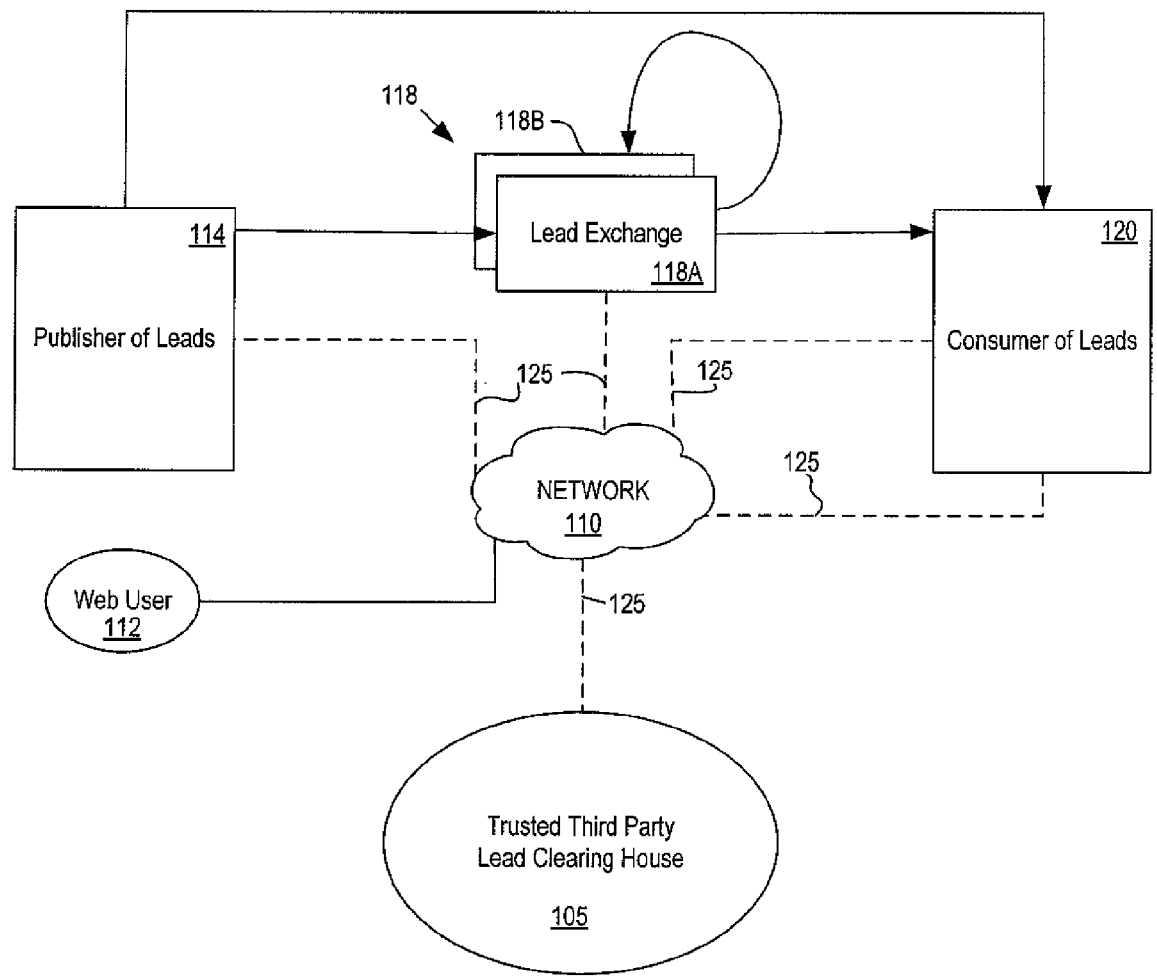
FIG. 1 is a diagram of an exemplary system that interfaces with a trusted third party clearing house for lead tracking.

FIG. 1 is a diagram of an exemplary system 100 that interfaces with a trusted third party clearing house (TTPCH) 105 for lead tracking over a network 110, such as the Internet. A new model of online business is evolving in which entities collect and sell personal data in the form of leads, which are indications that identified individuals are, or may be, interested in a marketed good or service. As discussed, leads may be obtained through Internet or other marketing in which a searcher submits (or otherwise supplies) personal and contact information to sign up for a free or reduced cost good or service, or to make a purchase, among others. Each lead contains at least one item of personal information, the most basic items including a person's name, address, e-mail address, and phone number, but may also include a social security number, a date of birth, and a prior address, etc.

The lead-selling model recognizes that lead information is itself a prized asset and so businesses may exist for the sole purpose of attracting web users 112 and collecting personal information submitted to the business, usually through an online submission form. Examples of such businesses are those that service the mortgage, bank, insurance, or automobile industries with potential buyers and that require personal details to be provided for the service to be delivered.

Such businesses will be referred to herein generally as a publisher 114 of leads because publishers 114 sometimes publish leads they have generated on a lead exchange 118 so that multiple lead consumers 120 may bid on the leads. Note that lead consumers 120 may also publish to a lead exchange 118, and thereby may be considered both a lead consumer 120 and a lead publisher 114 (or a lead seller) for purposes of this disclosure. Having a bidding process provides the opportunity to drive up prices of the leads through fostering competition, which may increase profits from lead sales. One lead exchange 118A may also republish a lead on a different lead exchange 118B, and lead exchanges 118 exist to serve as an intermediary, or central buying and selling location for leads between publishers 114 and consumers 120. In the alternative, as shown in FIG. 1, publishers 114 may directly sell leads to the lead consumers 120, who may then also publish leads in the clearing house.

Use of this model means individual goods and/or service providers (lead consumers 120) may purchase leads from the publishers 114, thereby obtaining leads without maintaining a separate website for the sole purpose of capturing lead information. Likewise, the consumers 120 do not have to run their own Cost Per Impression (CPM) or Cost Per Click (CPC) advertising campaigns, but need only purchase lead information from one or more Cost Per Lead (CPL) operators, such as a publisher 114 or a lead exchange 118.

The challenge is that both lead exchanges 118 and lead consumers 120 need to be able to verify the quality and freshness of the leads they purchase so as to protect from fraud and rogue CPL operators or publishers 114 (or consumers 120) who may sell the same lead many times or otherwise degrade the value of the lead. The TTPCH 105 may, therefore, be integrated within the system 100, wherein all the participants (publishers 114, lead exchanges 118, and lead consumers 120) are required to communicate with the TTPCH 105 to report thereto activity associated with the lead. Note that any participant may collect and sell lead information, and therefore, the teachings herein should not be understood to narrow in scope what applies to any given participant as each may play more than one role.

The activity history of a lead may be tracked through a log of the TTPCH 105 because of such communication, and the activity history may also include the numbers of times the lead has been sold, dates and time stamps of when the lead was purchased or sold, and a status of one or more lead consumers 120 currently working the lead. This allows any consumer 120 to check any lead that he or she may have purchased (or is considering purchasing) against the TTPCH 105 logs to see if the lead is fresh, if the lead is likely to have been in circulation for some time, or if it has been over-sold, etc.

Furthermore, each transaction of buying or selling leads is a high value transaction, and therefore, susceptible to fraud. The only way to truly consider the TTPCH 105 a "trusted" third party entity in the system 100 is to track an encrypted form of the lead information in lieu of the lead information itself. Doing so means that the TTPCH 105 is never allowed to see or access the actual lead information; nonetheless, it does provide precise status tracking of leads. A plurality of dashed lines 125 in FIG. 1 indicates paths over which encrypted versions of lead information are communicated to the TTPCH 105 to track events related to the lead containing such lead information. Note also that although lines connecting directly to the publishers 114, lead exchanges 118, and lead consumers 120 do not pass through the network 110, it should be understood that they may pass through the network 110, such as the Internet, when selling lead information from a publisher 114 to at least one of a lead exchange 118 and a lead consumer 120.

FIG. 2 is an exemplary block diagram 200 of a TTPCH 105 used to track leads after being encrypted in one of a variety of ways. Any number of one-way hash algorithms, such as Message Digest (MD4 or MD5) or Secure Hash Algorithm (SHA1), may be successfully used so long as the same algorithm is used by all participants in the system 100. A one-way hash algorithm compiles a stream of data into a small digest, e.g. a unique alpha-numeric sequence. Hashing with the algorithm is strictly a one-way operation in that the digest of the clear text data is not meant to be decrypted. Instead, the clear text data is verified through compiling the same clear text data with the same hash algorithm to generate the exact same alpha-numeric sequence or digest. That is, change of one digit of the clear text data may cause a drastic change in the digested version at the output of a one-way hash algorithm, making it easy to determine if the two clear text data streams relate exactly. One-way hash algorithms have been employed for digital signatures, for instance, where the digested signature information may be confirmed.

Figure 2A:
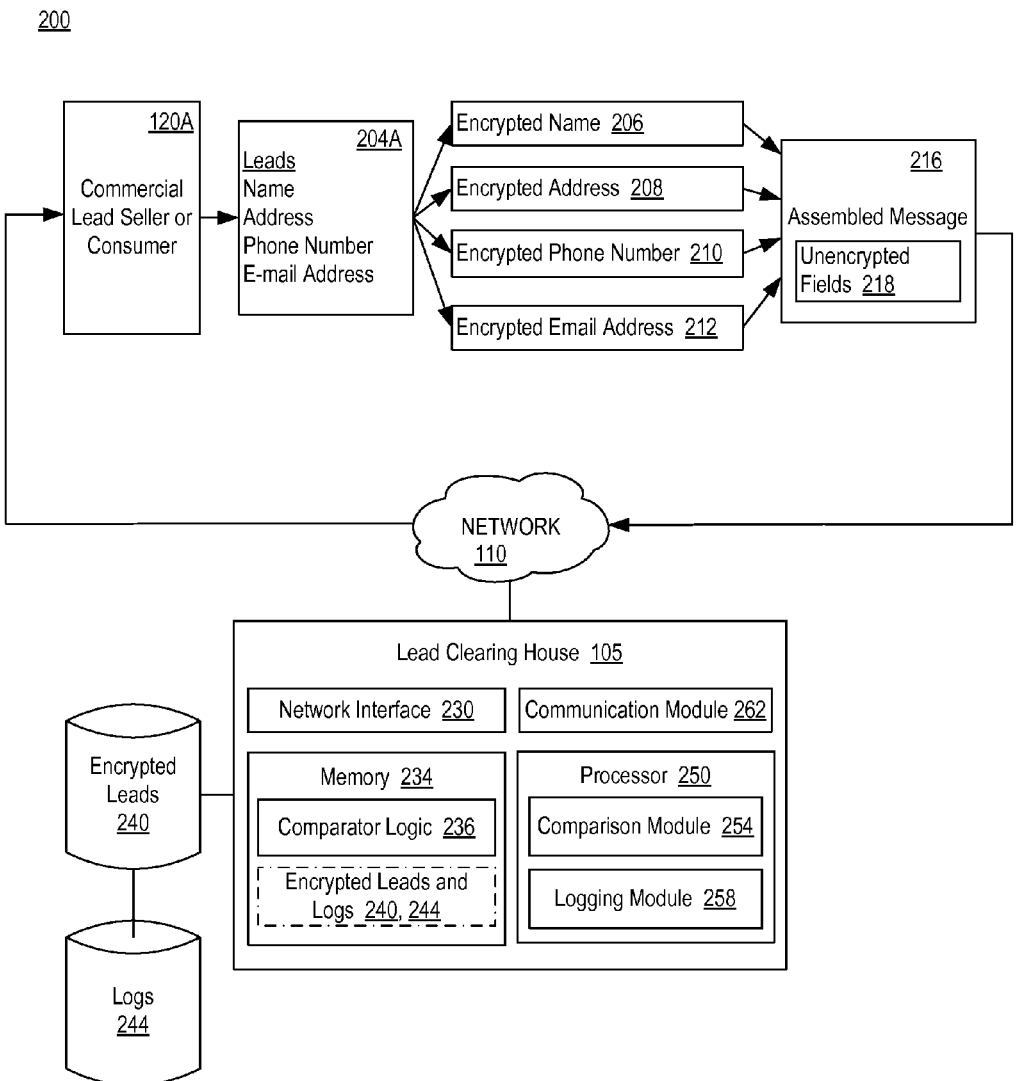
FIGS. 2A-2C are an exemplary block diagram of a trusted third party clearing house to track leads after personal lead information is encrypted in one of a variety of ways.
Figure 2B:
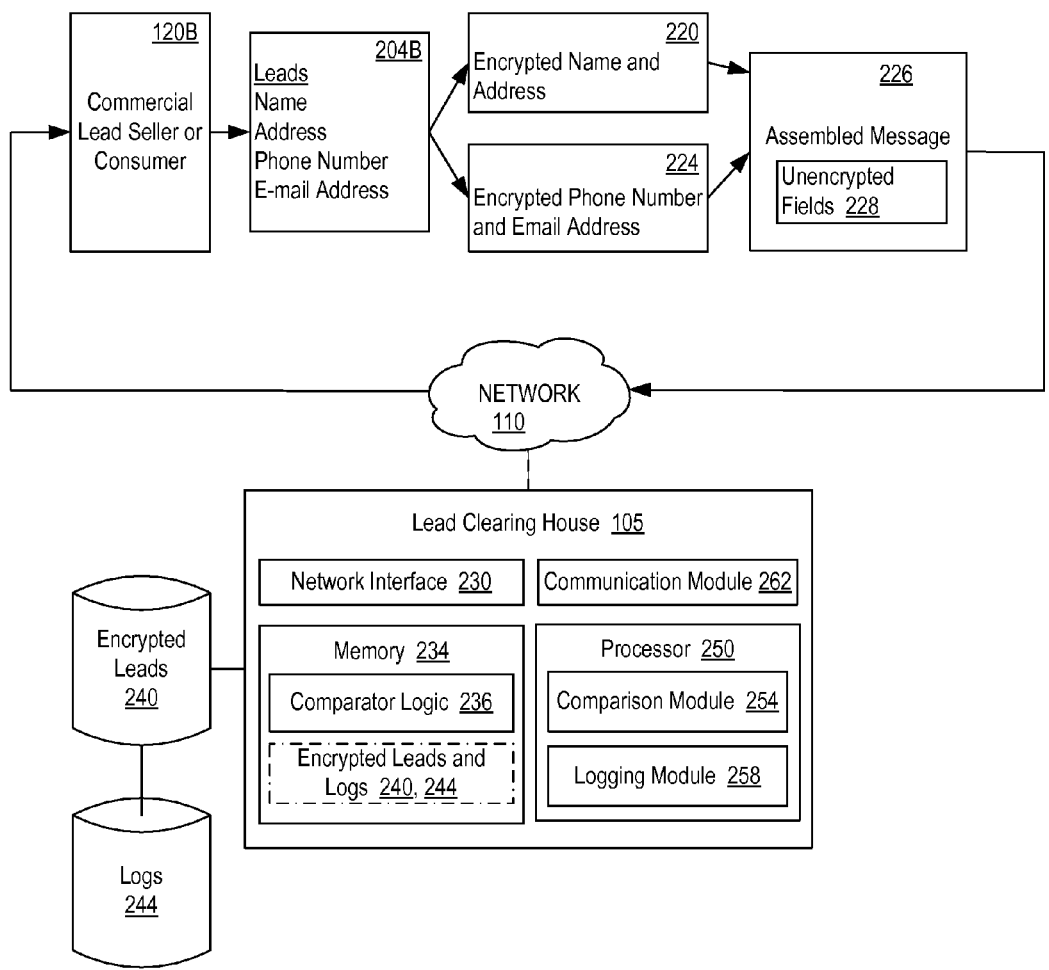
Figure 2C:
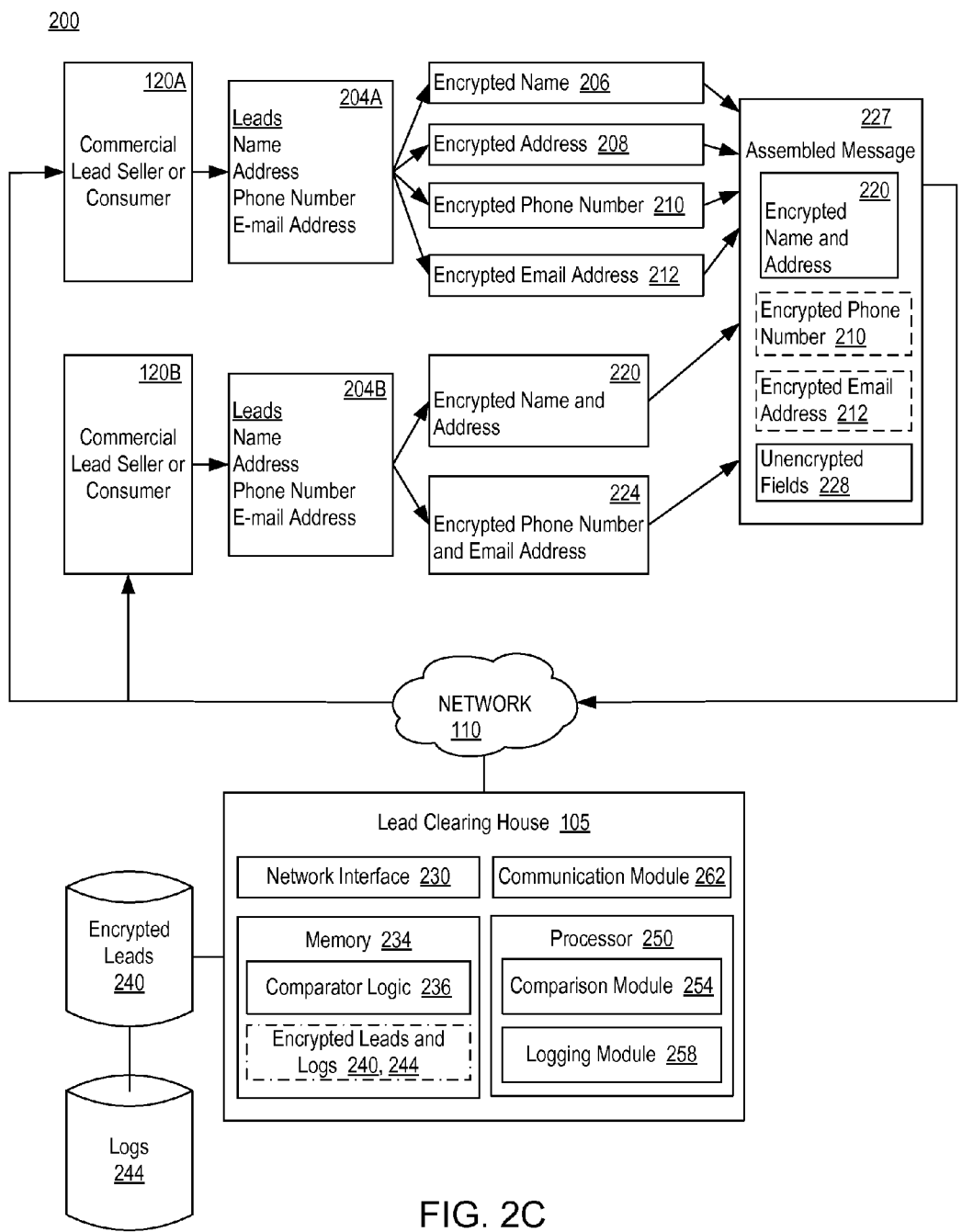

In FIGS. 2A-2C, commercial lead consumers 120A, 120B (or sellers) purchase a lead 204A and 204B, respectively, which in this case includes the same kind of information: a name, an address, a phone number, and an e-mail address. In some instances or in some applications, the lead information may include only some of this information or other information. Each piece of lead information is then pre-processed according to a set of pre-processing rules before encryption to ensure that each data field conforms to predetermined standards that will result in consist results of the one-way hash algorithm. For instance, pre-processing rules may include whether the year is two-digit or four-digit, whether information fields are in all caps, and a standardized way to express phone and social security numbers.

Items of personal lead information are then individually encrypted using a one-way hash algorithm as described above to produce a separately encrypted name 206, address 208, phone number 210, and e-mail address 212. The encrypted name 206, address 208, phone number 210, and e-mail address 212 are together assembled into a single message 216 containing the lead. The message 216 will also contain a variety of unencrypted fields 218 (FIG. 2A) that may also be passed through the above pre-processing process for consistency. Information in the unencrypted fields 218 may include date and time stamps of when the lead was captured, sold, and/or purchased, the lead type, and a participant identification (ID) (if using an authenticated connection as discussed later) to name just a few. Information in the unencrypted fields 218 will generally be additional log-related information that the TTPCH 105 may use to track statuses and statistics.

In the alternative, as shown in FIG. 2B, multiple items of personal lead information may be combined before being encrypted using the one-way hash algorithm. That is, for example, a lead 204B that contains the same type of personal information as a different lead 204A may be encrypted so that the name and address 220 are combined and encrypted together, and the phone number and e-mail address 224 are encrypted together. These combinations 220, 224 of encrypted lead information are then assembled into a single message 226 containing the lead. The message 226 may also include a variety of unencrypted fields 228 as discussed previously. A shown in FIG. 2C, a combination of encryption and assembling as disclosed with reference to FIGS. 2A and 2B may occur at the same time. More specifically, the combined encrypted name and address 220 may be assembled into a single message 227 together with one or more individual-encrypted items of personal lead information, such as for example, the encrypted phone number 210 and/or the encrypted email address 212. In the alternative, the combined encrypted phone number and email address 224 may be assembled into a single message 227 with the encrypted name 206 and/or the encrypted address 208. As before, unencrypted fields 228 may also be added into or attached as part of the message 227.

With further reference to FIGS. 2A-2C, the details of the TTPCH 105 are discussed. The TTPCH 105 includes a network interface 230, a memory 234 having comparator logic 236, an encrypted leads database 240, a logs database 244, and a processor 250 having at least a comparison module 254 and a logging module 258. Encrypted messages 216, 226 are passed over the network 110 to the TTPCH 105 to be logged therein for tracking the status of the leads 204A and 204B.

The TTPCH 105 includes the network interface 230 to receive, over the network 110, the messages 216, 226 having encrypted lead information 206-212 and 220, 224, respectively, the latter hereinafter variably referred to as "encrypted leads" for convenience. As discussed, the messages 216, 226 also include unencrypted lead information 218, 228, respectively. Despite that messages 216, 226 contain only a single encrypted lead each as herein described, note that they may contain more than one encrypted lead and, therefore, reference to "encrypted leads" is for ease of explanation only.

The encrypted leads database 240 is used to store the encrypted leads containing items of encrypted lead information 206-212 and 202, 224 along with the unencrypted fields 218, 228 as previously discussed. The log database 244 is provided to store and update a log for the encrypted leads and associated unencrypted fields 218, 228 stored in the encrypted leads database 240. One or more logs are created for, and associated with, each encrypted lead in the log database 244. In an alternative embodiment, a single log may be used to track multiple encrypted leads.

The memory 134 that is also provided includes comparator logic 236, among other software and data, and may additionally include the encrypted leads database 240 and logs database 244 locally in alternative embodiments depending on database size and need for storage flexibility. One of skill in the art will appreciate that databases 240, 244 may be combined into a single database, which may be located locally to, or across the network 110 from, the TTPCH 105.

The processor 250 communicates with the memory 234, the databases 240, 244, and the network interface 230 to process and log the received encrypted leads contained in the received messages 216, 226, 227. The processor 250 may include the comparison module 254 and the logging module 258, among others. The comparison module 254 compares newly received encrypted leads with those already stored in the database 240. The logging module 258 logs receipt of the encrypted leads, which may include nothing more than creating a log for a new encrypted lead as the encrypted lead is first stored. If a received encrypted lead matches a stored encrypted lead as determined by the comparison module 254, the log associated with the stored encrypted lead is updated with the receipt information, logged events, and any additional log-related information in the unencrypted fields 218, 228 associated with the matched encrypted lead. For instance, at a minimum, a count is incremented indicating the number of times the lead has been sold, and a date and time stamp from the unencrypted fields 218, 228 is logged to track the freshness of the lead after it has been sold.

A logged event may, therefore, include a variety of information, and the logging module 258 will be required to update a variety of possible fields in a log to be able to track lead statuses. These fields will generally track the possible information sent via the unencrypted fields 218, 228 of the messages 216, 226, 227. The communication module 262 communicates with both the processor 250 and the network interface 230 and sends to any participant requestor, whether a publisher 114, a lead exchange 118, or a lead consumer 120 that has been involved with a lead, a status based on one or more stored logged events.

Tracking a log for each lead in the TTPCH 105 protects against overselling a lead, which can cause a bad reputation for the lead consumer business as an excessive number of people will follow up on the lead and thus appear to be spamming the lead provider. A lead which has been in circulation a long time is stale and can have the same effect. The lead provider seeking the service (like in relation to obtaining a mortgage) is unlikely to appreciate a call several days or weeks after providing details to the publisher 114. It is best if a call is made within 24 hours to the lead provider. Making a call within 24 hours helps provide a positive experience to the lead provider.

Additionally, a lead consumer 120 may spam the TTPCH 105 to alter the statistics or statuses tracked therein, which may deter other lead consumers 120 from using the particular lead while the spamming consumer gets sole access to the lead provider. One mechanism to stop this includes requiring each lead consumer 120 to send encrypted leads over an authenticated connection (not shown) that informs the TTPCH 105 which consumer 120 (or participant) is sending each message, and the opportunity to remove duplicate submissions before logging status-related information.

To begin a log, ideally the publisher 114 sends fresh encrypted leads to create an initial record of the day and time that the leads were first sold. Note that a consumer 120 may also create the initial log if the publisher 114 did not do so. Each time another participant of the system 100 purchases or sells the lead, that participant is also required to send an encrypted version of the lead, along with any unencrypted fields 218, 228, to the TTPCH 105 using the same one-way hash algorithm as used during prior logged events. This requirement creates a trail of purchases of the lead that allows buyers (e.g., lead exchanges 118 or consumers 120) to assess the quality of a lead and sellers to guarantee to prospective buyers a certain level of quality. By also logging who the buyer and seller are (e.g., via the authentication system discussed previously) each time a lead changes hands, the TTPCH 105 may provide statuses to other participants that will indicate, based on the reputation of those that handle the lead, whether the other parties can expect the lead to be of quality.

Any lead exchange 118 may check incoming leads for freshness and can warranty a certain quality when reporting to a lead consumer 120. Typically, a lead can be sold to multiple buyers, but as the number of buyers goes up, the value of the lead goes down, and hence this quality score and warranty can be instrumental to establishing trust and quality across the lead exchange 118 with those lead consumers 120 bidding on their leads.

The more sophisticated the logging events logged by the logging module 258, the more useful interaction with the TTPCH 105 will be, thereby incentivizing participation in the system 100. For instance, logged events may additionally include recording whether a buyer bought the lead on an exclusive basis or based on a certain number of other buyers. This may be a default logged event if the TTPCH 105 receives, for the same lead, more than one indication of a lead sales event within a certain period of time, e.g. a number of hours to a number of days. Further logged events may include tracking the status of following up with and working a lead, such as whether a lead consumer 120 has contacted the lead, is in negotiations with a lead, has made a sale to, or conversion of, the lead, and whether or not there was some defect in the lead, e.g., an invalid piece of contact information that prevented contact with the lead.

A lead seller may also be able to provide conditions with sold leads such as by setting a period of time that a buyer has an exclusive right to sell a lead, thus minimizing the impact of possible subsequent sales. The seller may also validate the lead is not a duplicate or flag a lead that is already on the market, indicating that it is a duplicate. The seller may also validate that a lead that has a history of already being sold at least once has not been converted, e.g. a sale been completed with the lead provider. The seller can also validate through a logged event that a lead is being sold in the location of the address of the lead. These conditions and validations may be logged as individual headers or trailers appended to the lead, whether encrypted or not, such that the logging module 258 detects the same and updates the related log in the database 244.

The net result of increasingly sophisticated logged events and protection of the one-way hash algorithm used by the various parties of the system 100 means developing a trusted reputation between buyers and sellers of the system 100. Additional efforts may include prevention of unregistered, unauthenticated, or unauthorized parties from updating the status logs of the TTPCH 105 through keeping the one-way hash algorithms secret and requiring confidentiality agreements signed by the parties. The TTPCH 105 may also identify potentially fraudulent activity such as through noting discrepancies between compared encrypted leads, which indicates repeated attempts to guess a one-way hash algorithm. The TTPCH 105 may also track the ratings of each participant to the system 100 based on a history of disputes, selling duplicates, fraud, or otherwise gaming the system. If any participant abuses the system 100, that party can be blacklisted from TTPCH 105 access.

As discussed previously, an unencrypted field 218, 228 may include a lead type, wherein types may be standardized by identifier or name, thus allowing participants to register new lead types. Various conditions may then be associated with certain lead types as standardized by those in that particular industry, for instance by restricting the period of time that a party has to sell before it expires.

Figure 3:
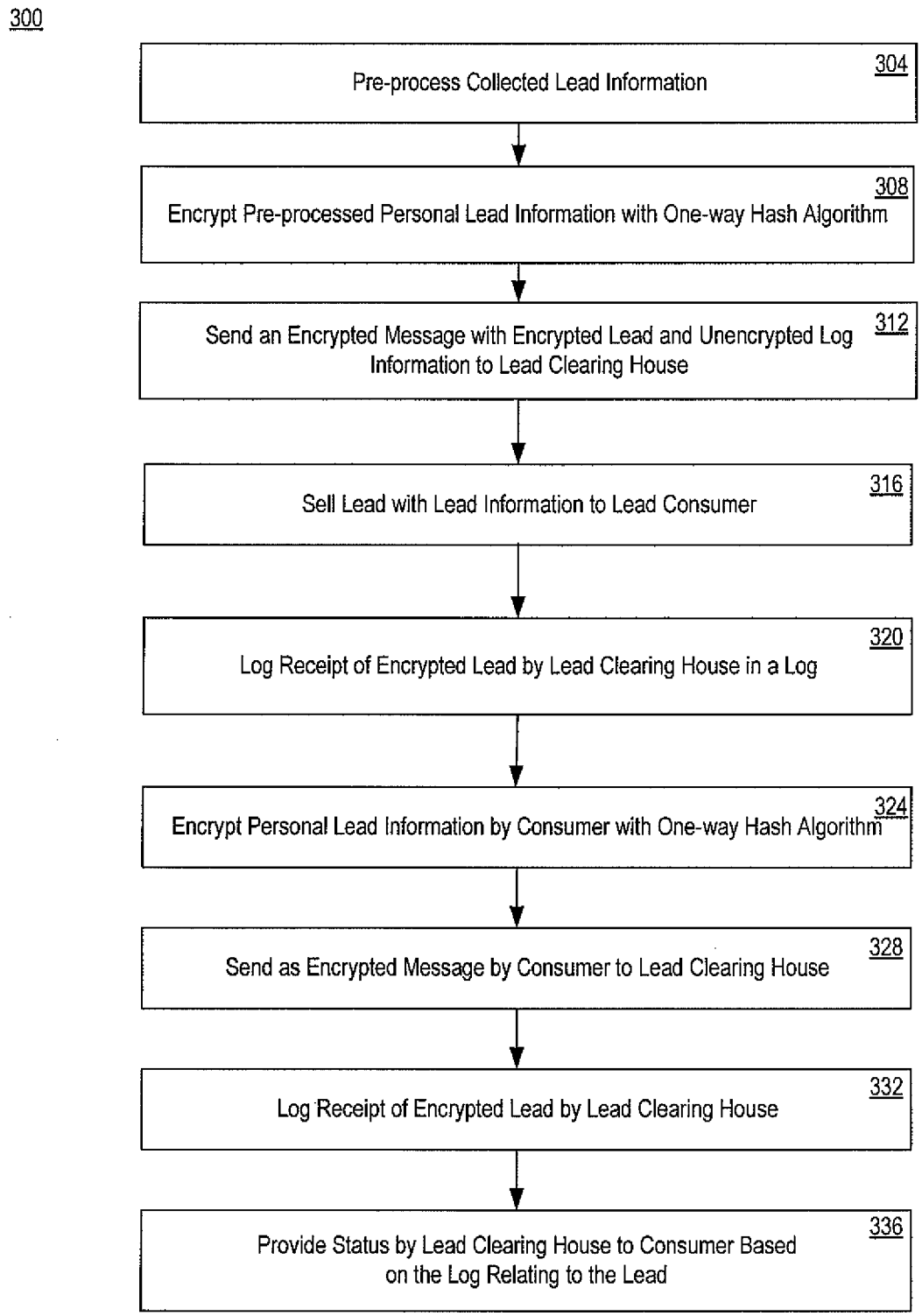
FIG. 3 is a flow chart of an exemplary method for tracking leads through the use of a trusted third party clearing house.

FIG. 3 is a flow chart 300 of an exemplary method for tracking leads through the use of a trusted third party clearing house (TTPCH) 105. At step 304, the publisher 114 pre-processes lead information as collected by a participant of the system 100. The participant, at step 308, encrypts personal lead information (206-212; 220-224) of the pre-processed lead with a one-way hash algorithm. The participant, at step 312, sends the encrypted message (216, 226) containing the encrypted lead and associated unencrypted log information (218, 228) to the TTPCH 105. The lead is then sold, at step 316, to a lead consumer 120.

The TTPCH then logs receipt, at step 320, of the encrypted lead in a log related in memory to the encrypted lead. The lead consumer 120 encrypts, at step 324, the personal lead information of the lead received from the participant with the one-way hash algorithm as a transmittable message (216, 226, 227). The lead consumer 120, at step 328, sends the encrypted message to the TTPCH 105 along with any updated log information (218, 228). The TTPCH 105 logs in the log, at step 332, receipt of the encrypted lead along with any additional log information (218, 228) associated with the encrypted lead. The TTPCH 105 provides, at step 336, a status to the lead consumer 120 based on the log relating to the lead. The various ways a log can be updated were covered above, which are numerous. The status may include any one or all of the logged events being tracked in a log related to the encrypted lead.

Figure 4:
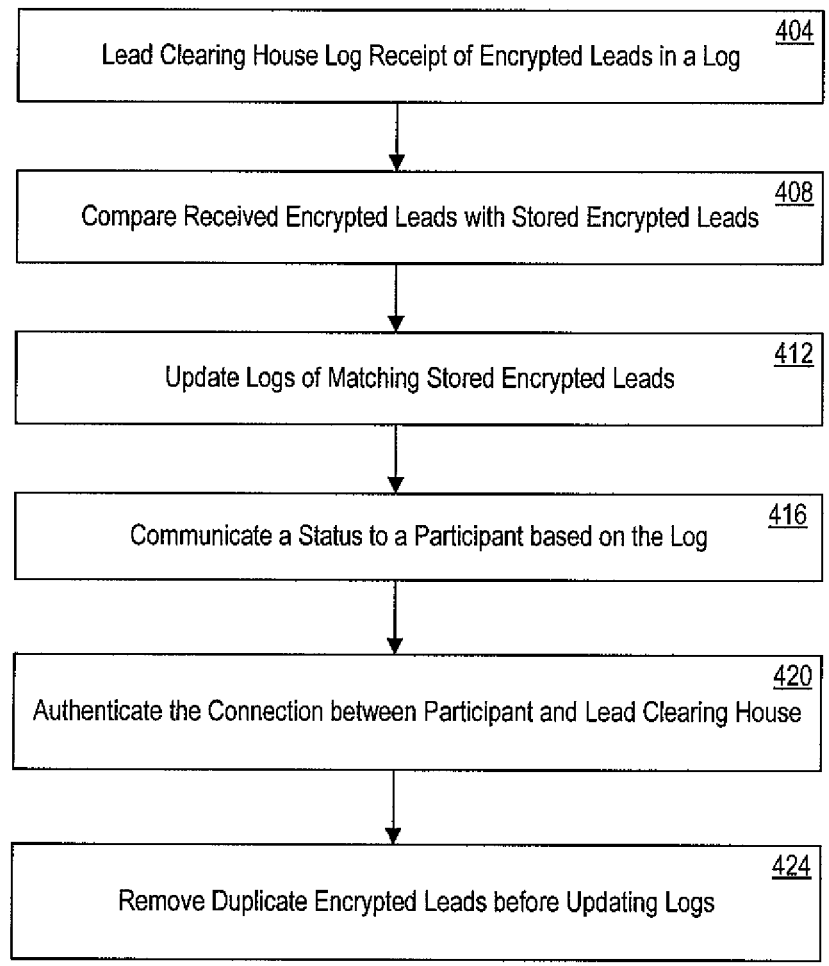
FIG. 4 is a flow chart of a further exemplary method for tracking leads through the use of a trusted third party clearing house.

FIG. 4 is a flow chart 400 of a further exemplary method for tracking leads through the use of a trusted third party clearing house (TTPCH) 105. The TTPCH 105, at step 404, logs receipt of one or more encrypted leads in a log as received from a participant of the TTPCH 105. As discussed, the one or more leads include personal lead information having been encrypted with a one-way hash algorithm. The TTPCH 105, at step 408, compares the received one or more encrypted leads with stored encrypted leads to find any matches. At step 412, the TTPCH 105 updates the log related to the one or more encrypted leads with unencrypted log information (218, 228) associated with the matching one or more encrypted leads. The TTPCH 105, at step 416, communicates a status to the participant based on the log relating to the one or more leads.

The TTPCH 105, at step 420, may also authenticate the connection between the participant and the TTPCH 105 when receiving the one or more encrypted leads, wherein the unencrypted log information includes a participant identification as a result of the authentication. The TTPCH 105, at step 424, may then remove duplicate encrypted leads before updating the logs of received duplicate leads that may be evidence of spamming the TTPCH by the participant. As previously discussed, the participant may include a publisher 114, a lead exchange 118, and/or a lead consumer 120. The status, therefore, may include the identity of the participant.

While specific embodiments and applications of various methods and systems for conducting experiments over the Internet have been illustrated and described, it is to be understood that the disclosure claimed herein is not limited to the precise configuration and components disclosed. Various modifications, changes, and variations apparent to those of skill in the art may be made in the arrangement, operation, and details of the methods and systems disclosed.

The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for securely tracking sales leads sold within a lead sales system, the method being carried out by a computer having a processor and system memory, the method comprising:
   pre-processing lead information by the computer for a lead obtained by a participant of the system; including:
   grouping together at least two different items of personal lead information of the pre-processed lead information, wherein the personal information is of a person to be contacted to pursue the lead;
   encrypting the group of personal lead information of the pre-processed lead information with a one-way hash algorithm;
   assembling the encrypted group of personal lead information together with one or more individually-encrypted items of personal lead information into a message;
   attaching to the message unencrypted lead information within unencrypted fields thereof;
   sending, by the computer, the message containing the encrypted lead information and the unencrypted lead information to a lead clearing house server for storage therein;
   comparing, with a processor of the lead clearing house server, the received encrypted lead information with encrypted leads stored in a system memory of the lead clearing house server, thereby finding a match between the received encrypted lead information and the stored encrypted leads;
   updating, with the processor, a log related to the encrypted lead information with unencrypted log information associated with the matching encrypted lead information; and
   selling, with the computer, an unencrypted version of the lead to a lead consumer.

2. The method of claim 1, further comprising the lead clearing house server:
   logging receipt of the encrypted lead information and any associated log information in a log related in memory to the lead.

3. The method of claim 1, wherein the participant is a lead consumer that has purchased the lead from a lead seller that sells the lead to another lead consumer.

4. The method of claim 2, further comprising the lead consumer:
   encrypting the personal lead information received from the participant upon purchase with the one-way hash algorithm as a transmittable message; and
   sending the message containing the encrypted lead information and the unencrypted lead information to the lead clearing house server for storage therein.

5. The method of claim 4, further comprising the lead clearing house server:
   logging receipt of the encrypted lead information from the consumer together with any updated log information associated with the encrypted lead information in the log; and
   providing a status to the consumer based on the log relating to the lead.

6. The method of claim 5, wherein the log comprises one or more of:
   a number of times the lead is received by the lead clearing house server;
   a date and time the lead is at least one of first captured and first sold;
   a number of times the lead has been re-sold; and
   where a consumer in possession of the lead is in the process of working the lead.

7. The method of claim 5, further comprising the lead clearing house server:
   authenticating at least one of the participant and the consumer when receiving the encrypted lead information from the at least one of the participant and the consumer, wherein authenticating comprises verifying a participant identification that is within the unencrypted lead information.

8. The method of claim 1, wherein each message includes one or more leads including the encrypted lead information, further comprising:
   communicating, with the processor and a network interface of the clearing house server, a status to the participant based on the log relating to the one or more leads.

9. The method of claim 8, wherein the participant of the lead clearing house server comprises one selected from the group consisting of a publisher, a lead exchange, and a lead consumer.

10. The method of claim 9, wherein the status comprises an identity of one selected from the group consisting of the publisher and a seller of the one or more leads.

11. The method of claim 9, wherein the status comprises a period of time that a consumer that sells the one or more leads sets for a subsequent consumer to sell the lead before it expires or to enjoy an exclusive right to sell the lead.

12. The method of claim 9, wherein the status comprises at least one of an identifier for a type of the one or more leads and a number of days the lead type dictates that a consumer has to re-sell the lead if desired.

13. The method of claim further comprising the lead clearing house server:
   authenticating a connection between the participant and the lead clearing house server when receiving the encrypted lead information, wherein the unencrypted log information comprises a participant identification as a result of the authentication; and
   removing duplicate encrypted leads before updating the logs of received duplicate leads.

14. The method of claim 8, wherein the status comprises one or more of:
   a number of times the one or more encrypted leads are received by the lead clearing house server;
   a date and time the encrypted lead is at least one of first captured and first sold; and
   a number of times the one or more leads have been re-sold.

15. The method of claim 8, wherein the status comprises one selected from the group consisting of progress of working the one or more leads, a report that an item of lead information of the one or more leads is invalid, and a combination thereof.

16. The method of claim 1, wherein the unencrypted log information of each lead comprises one or more of:
   a date and time stamp when the lead was captured;
   a date and time stamp when the lead was sold or purchased; and
   a lead type.

* * * * *